(12) United States Patent
Freeman et al.

(10) Patent No.: US 12,312,007 B2
(45) Date of Patent: May 27, 2025

(54) BODY STRUCTURE FOR VEHICLE HAVING REINFORCEMENT ASSEMBLY

(71) Applicant: Ford Global Technologies, LLC, Dearborn, MI (US)

(72) Inventors: Michael James Freeman, Allen Park, MI (US); Nicholas Stone Nace, Louisville, KY (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 17/882,191

(22) Filed: Aug. 5, 2022

(65) Prior Publication Data
US 2024/0043067 A1    Feb. 8, 2024

(51) Int. Cl.
| | |
|---|---|
| B62D 25/04 | (2006.01) |
| B60J 3/00 | (2006.01) |
| B60R 16/02 | (2006.01) |
| B60R 16/08 | (2006.01) |
| B60R 21/232 | (2011.01) |

(52) U.S. Cl.
CPC ............... B62D 25/04 (2013.01); *B60J 3/00* (2013.01); *B60R 16/0207* (2013.01); *B60R 16/08* (2013.01); *B60R 21/232* (2013.01)

(58) Field of Classification Search
CPC ....... B62D 25/04; B60J 3/0217; B60J 3/0221; B60J 3/0213; B60N 3/026
See application file for complete search history.

(56) References Cited

U.S. PATENT DOCUMENTS

| | | | |
|---|---|---|---|
| 9,771,109 B2 | 9/2017 | Nagwanshi et al. | |
| 10,913,500 B2 | 2/2021 | Donabedian et al. | |
| 10,933,922 B2 | 3/2021 | Belpaire et al. | |
| 2005/0242550 A1* | 11/2005 | MacNee | B60J 7/1252 |
| | | | 280/730.2 |
| 2008/0111395 A1* | 5/2008 | Longwell | B60R 13/0206 |
| | | | 296/187.05 |
| 2016/0229457 A1* | 8/2016 | Boettcher | B62D 25/02 |
| 2018/0036970 A1 | 2/2018 | Chmielewski et al. | |
| 2024/0025483 A1* | 1/2024 | Freeman | B62D 21/15 |

FOREIGN PATENT DOCUMENTS

| | | | | |
|---|---|---|---|---|
| GB | 2538279 A | * | 11/2016 | ............. B60N 3/023 |
| GB | 2611814 A | * | 4/2023 | ............. B60N 3/023 |
| WO | WO-0121442 A1 | * | 3/2001 | ............. B60R 11/00 |

* cited by examiner

*Primary Examiner* — Daniel J Colilla
(74) *Attorney, Agent, or Firm* — Burris Law, PLLC

(57) ABSTRACT

A vehicle body structure includes a vehicle pillar and a unitized reinforcement bracket. The unitized reinforcement bracket is mounted to the vehicle pillar and includes a reinforcement body and one or more stanchions. The reinforcement body extends along a longitudinal direction of the vehicle pillar. The stanchions are located at an inboard side of the vehicle pillar and are configured for mounting a vehicle component.

23 Claims, 7 Drawing Sheets

BODY STRUCTURE FOR VEHICLE HAVING REINFORCEMENT ASSEMBLY

FIELD

The present disclosure relates to a body structure for a vehicle having a reinforcement assembly and a vehicle including a body structure having a reinforcement assembly.

BACKGROUND

The statements in this section merely provide background information related to the present disclosure and may not constitute prior art.

Vehicles such as sport utility vehicles, for example, include both a front door and a rear door on one side of the vehicle, and are designed to carry multiple occupants. Such vehicles also include vehicle pillars (e.g., A pillars, B pillars, and C pillars) that frame the doors and support a roof of the vehicle while adding to the structural integrity of the vehicle. Some vehicles include pillar reinforcements that are associated with the vehicle pillars and add further structural integrity to the vehicle. The present disclosure addresses potential challenges regarding conventional reinforcements.

SUMMARY

This section provides a general summary of the disclosure and is not a comprehensive disclosure of its full scope or all of its features.

The present disclosure provides a body structure comprising a reinforcement assembly that transfers loads to a vehicle pillar during operation of a vehicle.

In one form, the present disclosure provides a vehicle body structure including a vehicle pillar and a unitized reinforcement bracket. The reinforcement bracket is mounted to the vehicle pillar and includes a reinforcement body and one or more stanchions. The reinforcement body extends along a longitudinal direction of the vehicle pillar. The stanchions are located at an inboard side of the vehicle pillar and are configured for mounting a vehicle component.

In variations of the body structure of the above paragraph, which may be implemented individually or in any combination: the vehicle pillar includes an outer member and an inner member secured to each other to define an internal cavity, the unitized reinforcement bracket is mounted to the inner member; the unitized reinforcement bracket is located external to the internal cavity; the vehicle pillar is an A-pillar; the unitized reinforcement bracket extends substantially an entire length of the vehicle pillar; the unitized reinforcement bracket includes mounting features configured to secure at least one of a wire bundle, a fluid line, and an air curtain to the unitized reinforcement bracket; the mounting features are snap-fit attachments; the reinforcement body comprises a mounting portion that contacts the vehicle pillar, the mounting portion includes a plurality of first mounting structures located in a forward direction of the one or more stanchions and a plurality of second mounting structures located in a rearward direction of the one or more stanchions; a trim panel is secured to the vehicle pillar, the reinforcement body being disposed between the trim panel and the vehicle pillar; the unitized reinforcement bracket is mounted to the vehicle pillar by mechanical fasteners; the stanchions are disposed between two arcuate walls of the reinforcement body; and the stanchions are spaced apart from the vehicle pillar.

In another form, the present disclosure provides a vehicle body structure including a vehicle pillar, a unitized reinforcement bracket, and a visor assembly. The vehicle pillar includes an outer member and an inner member secured to each other. The reinforcement bracket includes a reinforcement body and one or more stanchions. The reinforcement body includes a pillar mounting portion mounted to the inner member of the vehicle pillar and a plurality of support portions extending from the pillar mounting portion. The stanchions are located at an inboard side of the inner member of the vehicle pillar and are connected to the pillar mounting portion by one or more support portions of the plurality of support portions. The visor assembly is coupled to the stanchions.

In variations of the body structure of the above paragraph, which may be implemented individually or in any combination: the visor assembly is rotatably coupled to the one or more stanchions; the stanchions are connected to the pillar mounting portion by two support portions of the plurality of support portions, one support portion of the two support portions extends from a first location of the pillar mounting portion and the other support portion of the two support portions extends from a second location of the pillar mounting portion that is lower than the first location; and the unitized reinforcement bracket includes a first end located toward a front of the vehicle pillar and a second end located toward a rear of the vehicle pillar, the unitized reinforcement bracket has an arcuate shape from the first end toward the second end.

In yet another form, the present disclosure provides a body structure for a vehicle that includes an A-pillar, a unitized reinforcement bracket, a trim panel, and a visor assembly. The unitized reinforcement bracket is located externally relative to the A-pillar and includes a reinforcement body and one or more stanchions. The reinforcement body extends along a longitudinal direction of the A-pillar and includes a pillar mounting portion mounted to the A-pillar and a plurality of support portions extending from the pillar mounting portion. The stanchions are located at an inboard side of the A-pillar and are connected to the pillar mounting portion by one or more support portions of the plurality of support portions. The trim panel is secured to the A-pillar and houses the unitized reinforcement bracket. The visor assembly is rotatably coupled to the stanchions. The unitized reinforcement bracket includes mounting features configured to secure at least one of a wire bundle, a fluid line, and an air curtain to the unitized reinforcement bracket.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
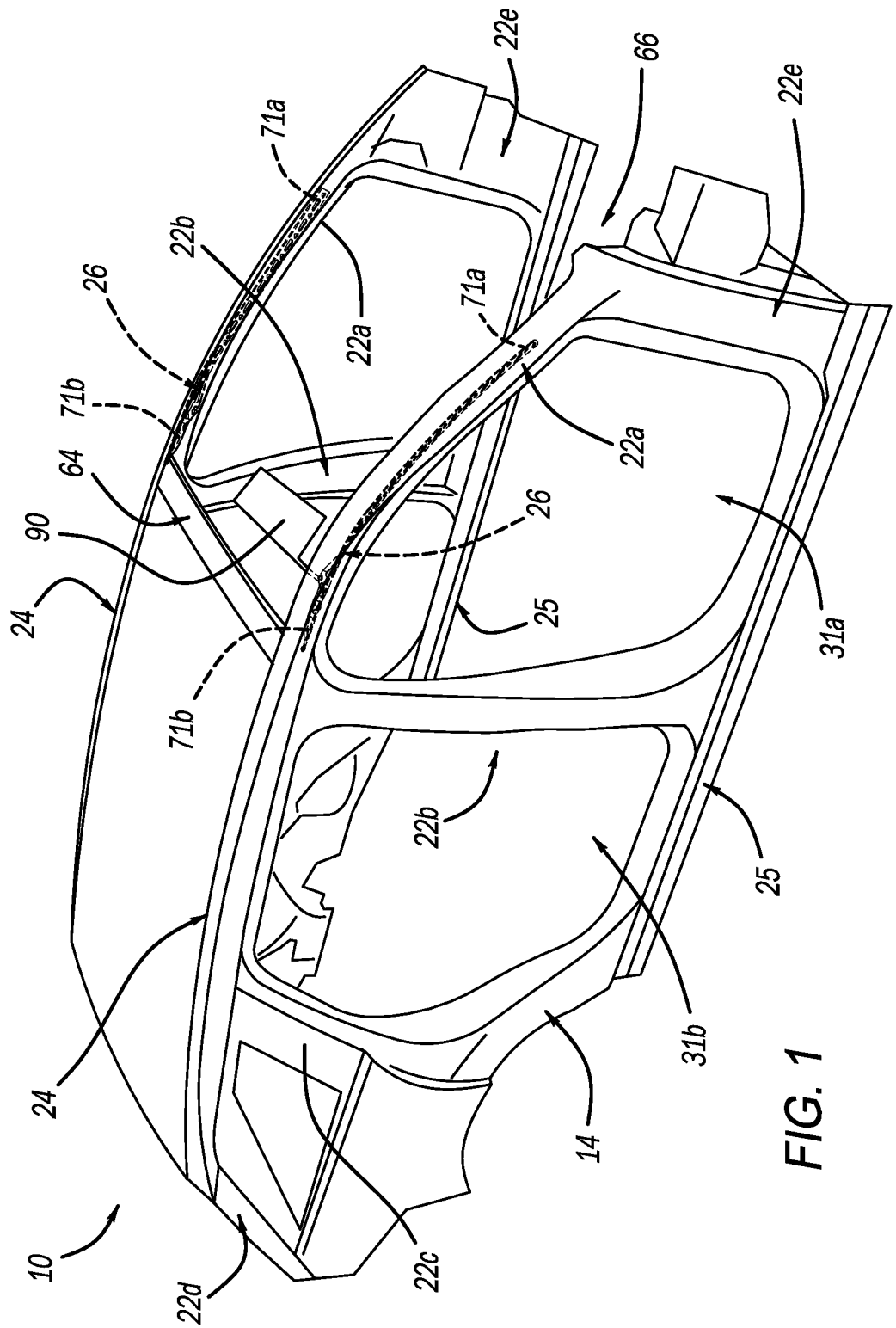
FIG. 1 is a perspective view of a vehicle body structure having vehicle pillars including reinforcement brackets according to the principles of the present disclosure.
Figure 6:
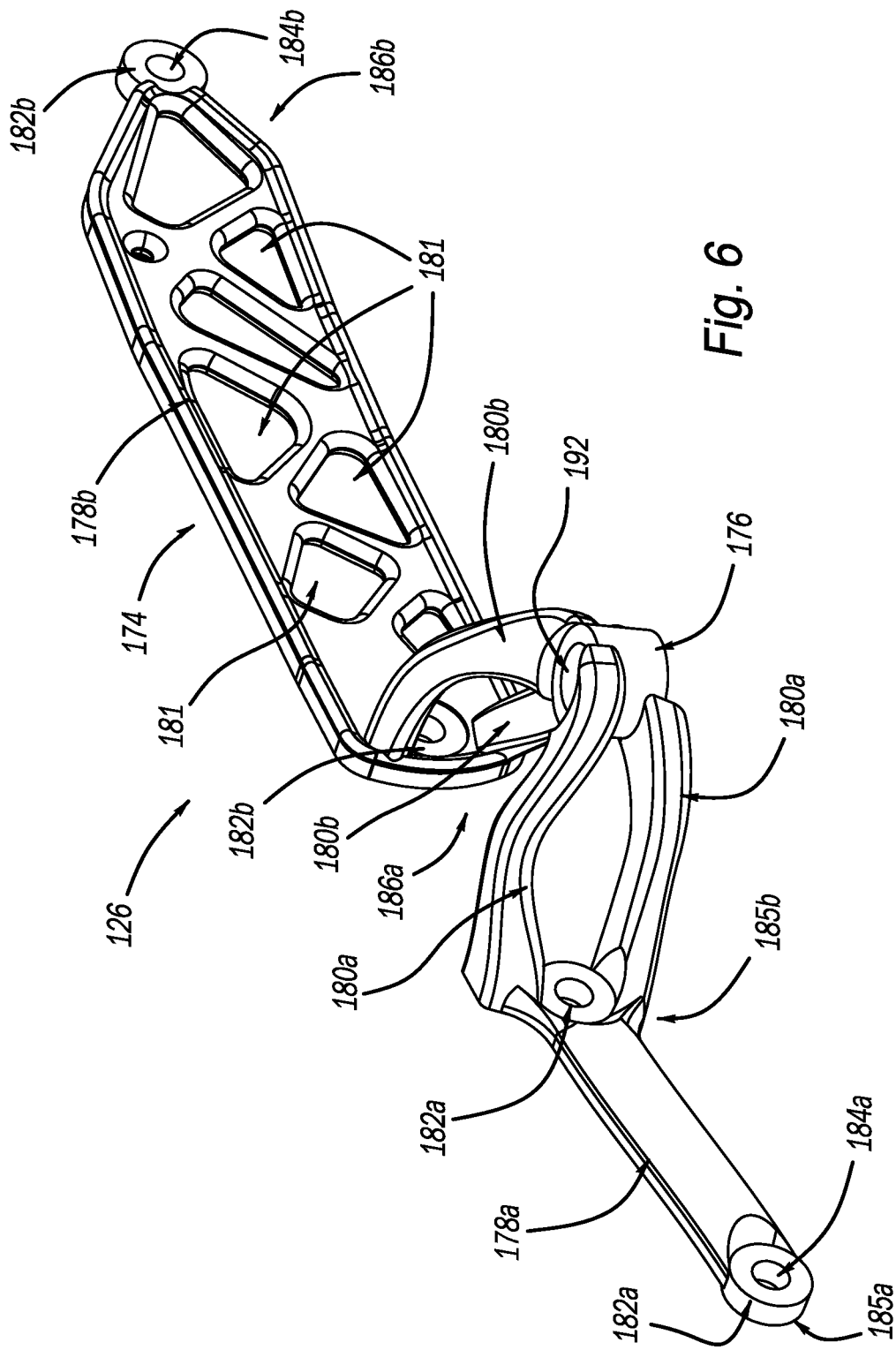
Figure 7:
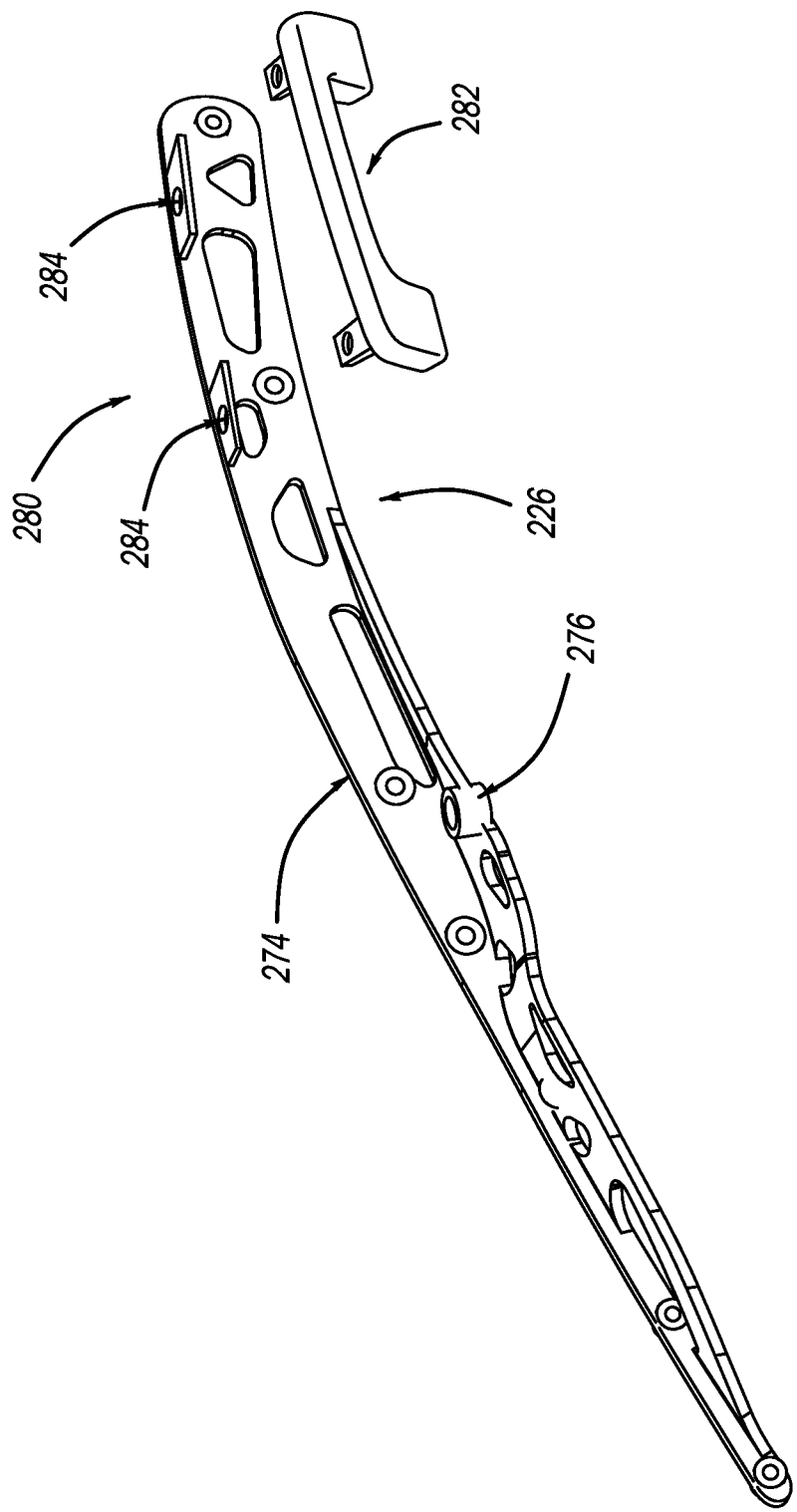

FIG. 6 is a perspective view of a reinforcement bracket of a second form that can be incorporated into the vehicle body structure of FIG. 1, in accordance with the principles of the present disclosure; and FIG. 7 is a perspective view of a reinforcement bracket of yet another form that can be incorporated into the vehicle body structure of FIG. 1, in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is illustrated having a body structure 14. In some forms, the vehicle 10 can be an electric vehicle such as a battery electric vehicle (BEV), wherein drive wheels (not shown) are driven by electric motors (not shown) that receive power from a battery pack (not shown). In other examples, the vehicle 10 may be a hybrid electric vehicle (HEV), a plug-in electric vehicle (PHEV), an internal combustion vehicle, or a fuel cell vehicle, among others.

In the example illustrated, each side (i.e., left and right sides) of the vehicle body structure 14 includes a plurality of pillars (e.g., A-pillars 22a, B-pillars 22b, C-pillars 22c, D-pillars 22d and hinge pillars 22e), a roof side rail assembly 24, a rocker 25, and a reinforcement bracket 26. The A-pillars 22a, the B-pillars 22b, the C-pillars 22c, the rockers 25 and the roof side rail assemblies 24 cooperate to define front door openings 31a in the vehicle body structure 14 on corresponding left and right sides of the vehicle 10. The B-pillars 22b, C-pillars 22c, the rockers 25, and the roof side rail assemblies 24a, 24b cooperate to define rear door openings 31b in the vehicle body structure 14 on corresponding left and right sides of the vehicle 10. Doors (not shown) are rotatably coupled to the vehicle body structure 14 (e.g., hinge pillars 22e or the B-pillars 22b) to be rotated between a closed position in which the doors are disposed within the door openings 31a or 31b and an open position in which the doors are removed from the door openings 31a or 31b. The vehicle body structure 14 can be a unibody vehicle architecture, though other configurations can be used, such as a body on frame vehicle architecture for example.

Figure 2:
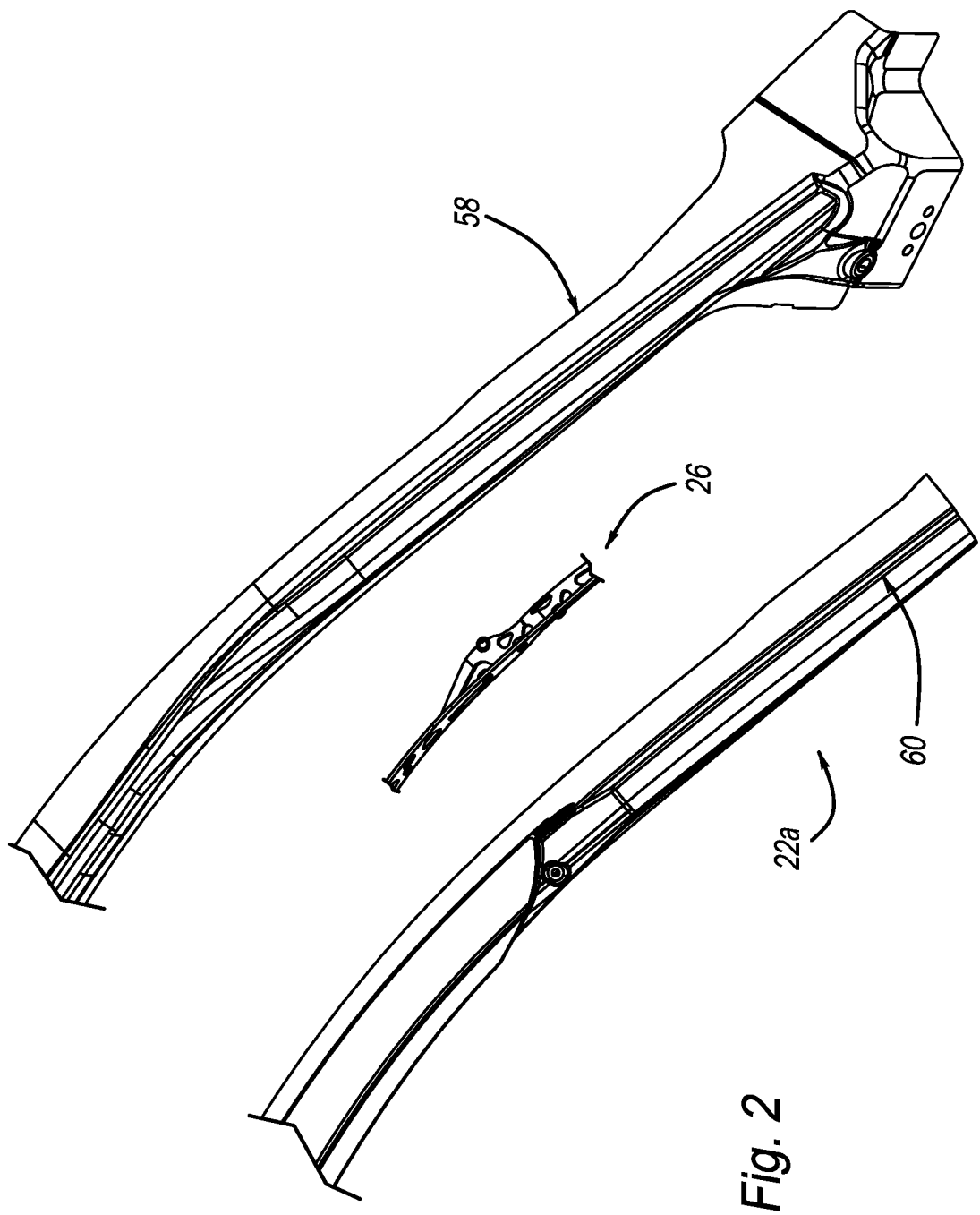
FIG. 2 is an exploded perspective view of a one of the vehicle pillars of the vehicle body structure of FIG. 1.
Figure 3:
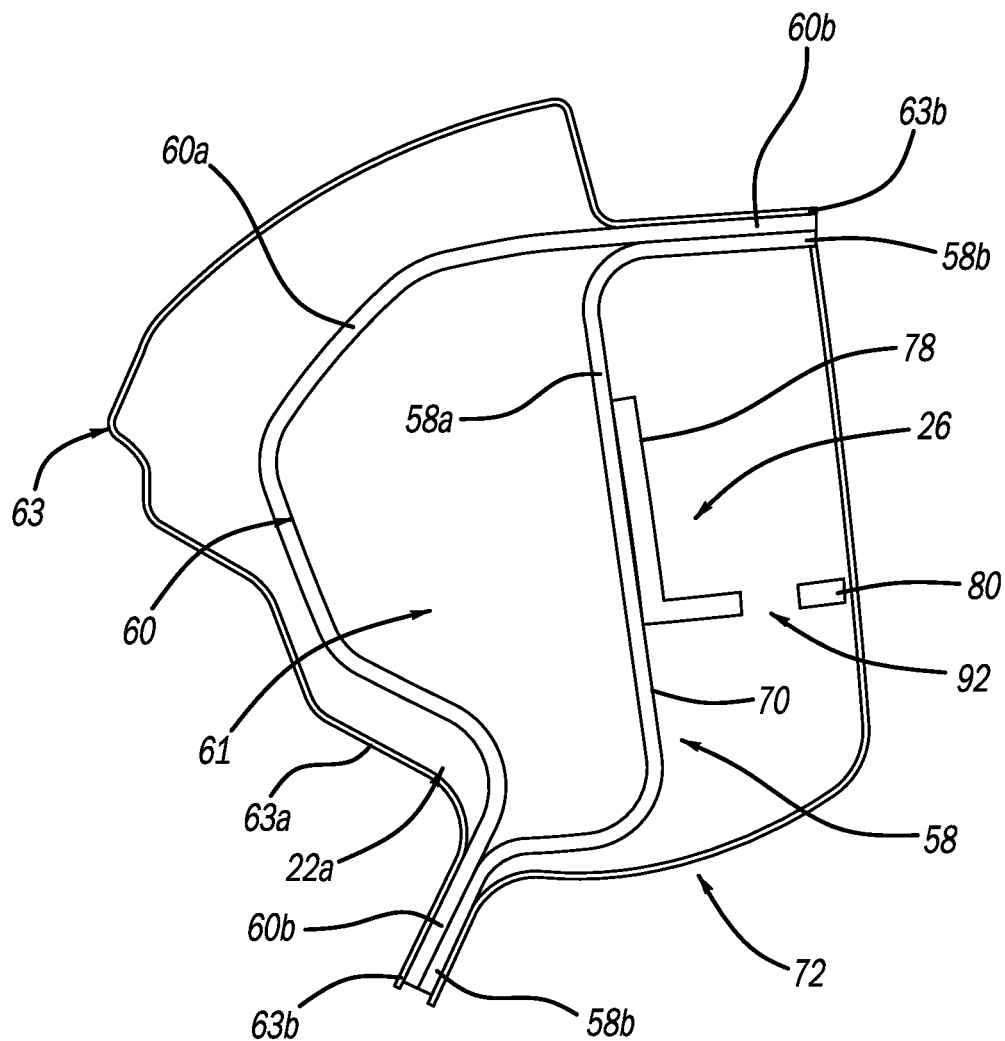
FIG. 3 is a cross-sectional view of the assembled vehicle pillar of FIG. 2.

Referring to FIGS. 2 and 3, each A-pillar 22a extends from a front end of a respective roof side rail assembly 24 (FIG. 1) to a respective hinge pillar 22e (FIG. 1) and includes an inner shell or member 58 and an outer shell or member 60 that are secured to each other to define an internal cavity 61. In the example illustrated, the inner shell 58 has a generally S-shaped cross-section and the outer shell 60 has a generally U-shaped cross-section. In some forms, the inner shell 58 and the outer shell 60 may include different shapes. In the example illustrated, the internal cavity 61 does not include any other reinforcement plates or brackets. In some forms, one or more additional reinforcement members (not shown) may be disposed within the internal cavity 61 and may be welded to at least one of the inner shell 58 and the outer shell 60. The inner shell 58 includes a body 58a and a pair of flanges 58b and the outer shell 60 includes a body 60a and a pair of flanges 60b. The flanges 58b of the inner shell 58 are secured to the flanges 60b of the outer shell 60 so that the internal cavity 61 is generally defined between the body 58a and the body 60a.

The vehicle body structure 14 also includes a pair of outer body members 63 (only one shown in the figures). Each outer body member 63 is secured to an outer shell 60 of the respective A-pillar 22a, the respective roof side rail assembly 24 (FIG. 1), and/or a roof 65 (FIG. 1) of the vehicle 10 that spans laterally between the roof side rail assemblies 24. Each outer body member 63 extends generally in the longitudinal direction of the vehicle 10 (i.e., along the longitudinal direction of the A-pillar 22a) and at least partially surrounds the respective outer shell 60.

In one form, each outer body member 63 and one or more pillar shells (e.g., inner shell 58, outer shell 60) are separate components that are secured to each other via mechanical fasteners, welding, adhesives or any other suitable attachment means. In some forms, each outer body member 63 and one or more pillar shells (e.g., inner shell 58, outer shell 60) form a single component. Each outer body member 63 has a material gauge that is less than a material gauge of the inner and outer shells 58, 60 of the A-pillar 22a. Each outer body member 63 includes a U-shaped body 63a and a pair of flanges 63b extending generally perpendicularly from the body 63a. The pair of flanges 63b are secured to the respective outer shell 60. Each outer body member 63 may optionally include one or more class A surfaces.

Referring back to FIG. 1, each B-pillar 22b extends downward from a respective roof side rail assembly 24 to a respective rocker 25. Each B-pillar 22b may extend from or near a middle portion of the respective roof side rail assembly 24 to or near a middle portion of the respective rocker 25. In the example illustrated, the vehicle body structure 14 includes a rear header (not shown) and a roof bow 64 (FIG. 1). The rear header is located at a rear of the vehicle 10 and extends in a transverse direction relative to a longitudinal direction of the vehicle 10. The rear header is also attached to the pair of roof side rail assemblies 24 at a location near the D-pillars 22d. In some forms, the rear header may be attached to the pair of roof side rail assemblies 24 at a location near the C-pillars 22c. The roof bow 64 is located further forward toward a front of the vehicle 10 compared to the rear header and extends in the transverse direction (e.g., side-to-side) of the vehicle 10, the transverse direction being transverse to the longitudinal direction (e.g., forward-rearward direction) of the vehicle 10. The roof bow 64 is also attached to the pair of roof side rail assemblies 24 and may be attached thereto at a location near the B-pillars 22b. In the example illustrated, the vehicle body structure 14 does not include a front header extending in the transverse direction of the vehicle 10 and attached to the pair of A-pillars 22a. In this way, a windshield (not shown) of the vehicle 10 may extend from a front end 66 of the vehicle 10 (e.g., near the hinge pillars 22e) to the roof bow 64 rearward of the A-pillars 22a, which provides occupants of the vehicle 10 with greater visibility compared to a vehicle where the windshield extends from the front end 66 to a front header near the A-pillars 22a.

The pair of roof side rail assemblies 24 are positioned at opposing sides of the vehicle 10 and extend along a longitudinal direction of the vehicle 10. In some forms, each of the roof side rail assemblies 24 include one or more structural rails (not shown) having a circular shape, a rectangular shape or any other suitable shape.

Figure 4:
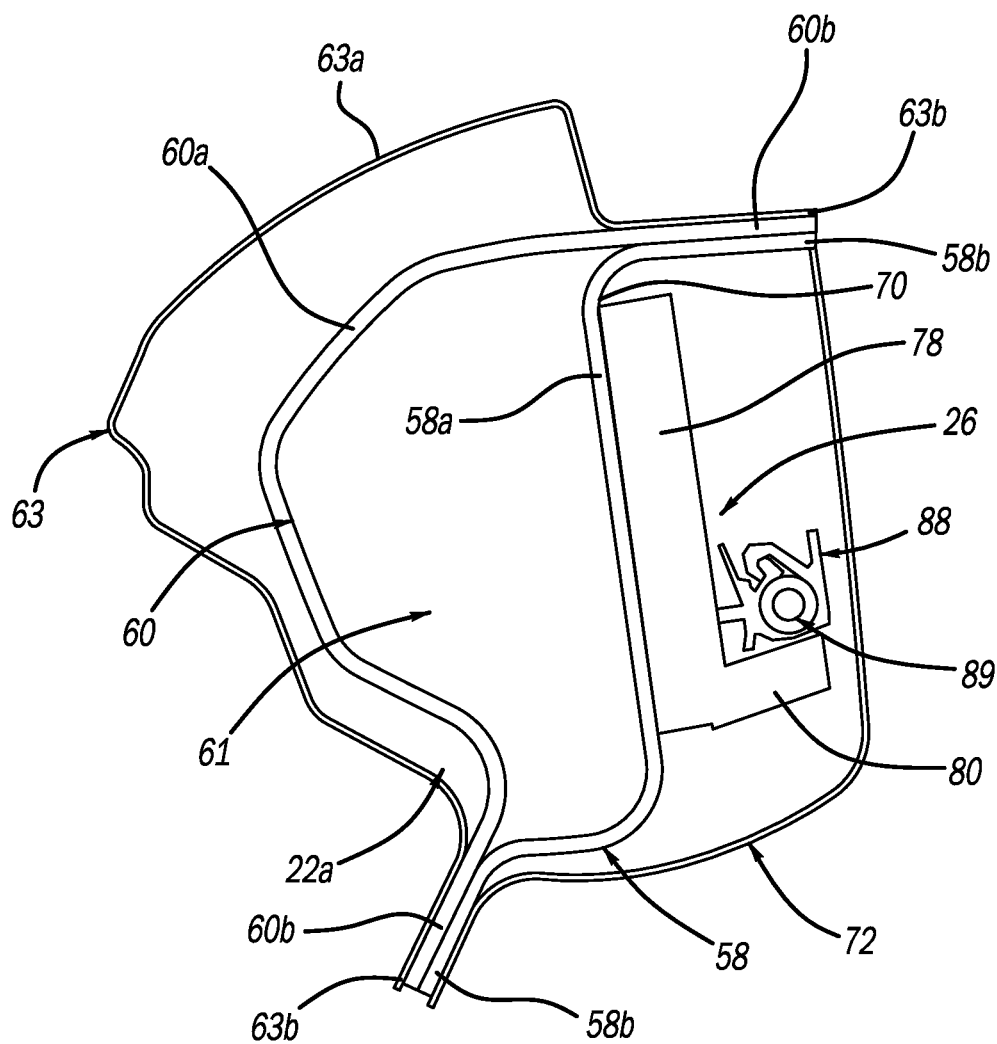
FIG. 4 is another cross-sectional view of the assembled vehicle pillar of FIG. 2.
Figure 5:
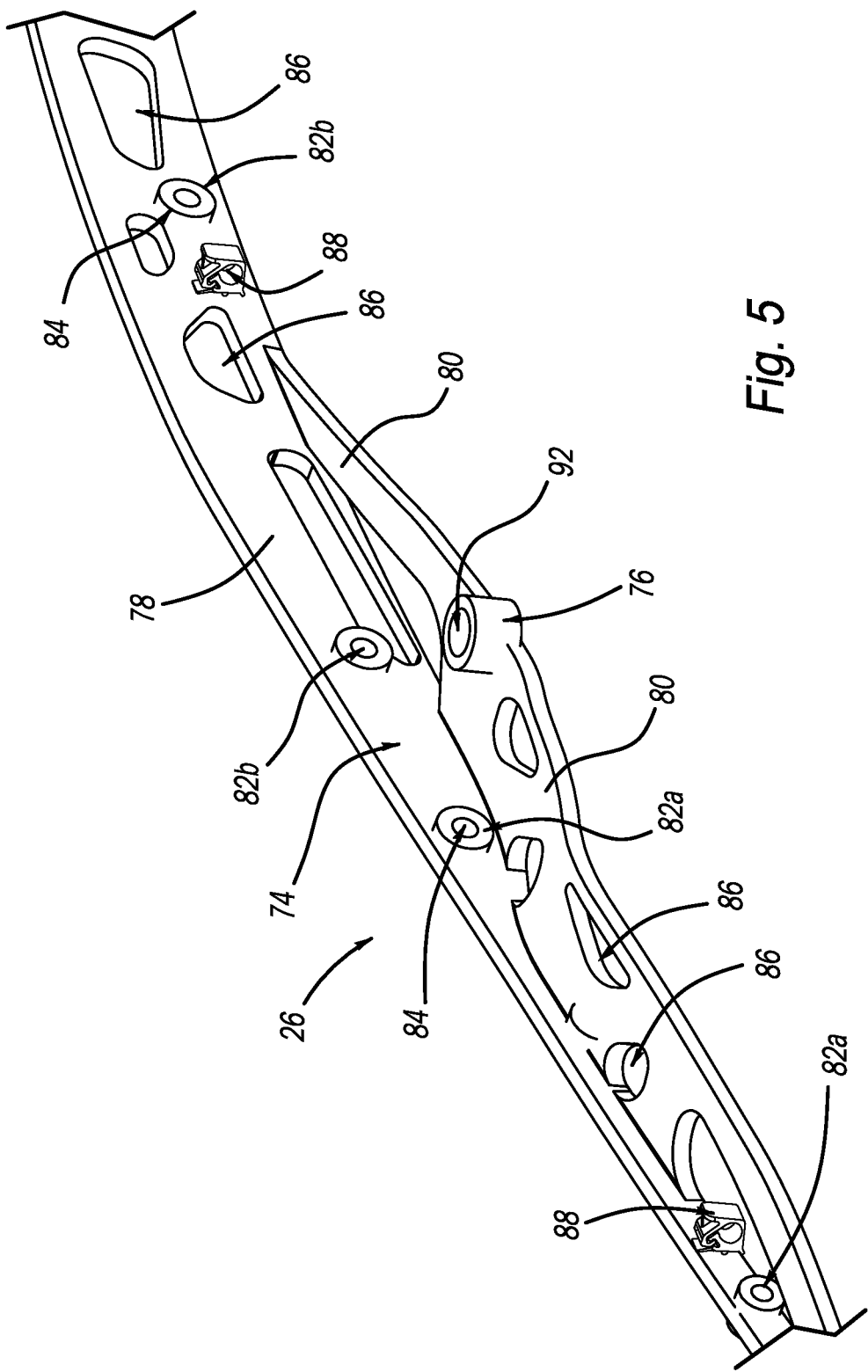
FIG. 5 is a perspective view of one of the reinforcement brackets of FIG. 1.

With reference to FIGS. 3-5, each reinforcement bracket 26 is associated with a respective A-pillar 22a (FIG. 1) and is in the form of a single unitized, monolithic body that can be manufactured by an additive manufacturing process. As used herein, unitized means a unitarily formed single part, i.e., single piece of material, as opposed to an assembly of separately formed and attached parts. The manufacturing process can include laser sintering, for example, that can generally include a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure. Although the reinforcement brackets 26 are shown in the figures associated with the A-pillars 22a (FIG. 1), the reinforcement brackets 26 may be associated with other vehicle pillars (e.g., C-pillars 22c, shown in FIG. 1) while still remaining within the scope of the disclosure.

Each reinforcement bracket 26 is secured to an inboard side 70 of the inner shell 58 and is located external to the internal cavity 61. In the example illustrated, each reinforcement bracket 26 extends substantially an entire length of the respective A-pillar 22a but is located closer towards the B-pillar 22b than the hinge pillar 22e, as shown in FIG. 1. That is, a first end 71a (FIG. 1) of each reinforcement bracket 26 is located proximate a front end of the A-pillar 22a and a second end 71b (FIG. 1) of each reinforcement bracket 26 is located proximate a rear end of the A-pillar 22a. Each reinforcement bracket 26 has an overall arcuate shape from the first end 71a toward the second end 71b. The arcuate shape can generally follow the curvature of the A-pillar 22a. In some forms, each reinforcement bracket 26 extends the entire length of the respective A-pillar 22a. In other forms, each reinforcement bracket 26 extends less than half the entire length of the respective A-pillar 22a. As shown in FIGS. 3 and 4, a trim panel 72 is secured to a respective A-pillar 22a and surrounds the respective reinforcement bracket 26 (i.e., the reinforcement bracket 26 is disposed between the trim panel 72 and the inner shell 58 of the A-pillar 22a). In this way, the reinforcement bracket 26 and the inner shell 58 of the A-pillar 22a are hidden from view from inside the occupant cabin.

Each reinforcement bracket 26 includes a reinforcement body 74 and one or more stanchions 76 (one shown). The reinforcement body 74 extends along a longitudinal direction of the vehicle A-pillar 22a and is secured to the inboard side 70 of the inner shell 58. Stated differently, the reinforcement body 74 corresponds to the shape of the inner shell 58.

The reinforcement body 74 includes a mounting portion 78 and a plurality of support portions 80. The mounting portion 78 contacts the inboard side 70 of the inner shell 58 and includes a plurality of first mounting structures 82a and a plurality of second mounting structure 82b. The plurality of first mounting structures 82a are located in a forward direction of the stanchions 76 (i.e., closer toward the first end 71a of the reinforcement bracket 26) and the plurality of second mounting features 82b are located in a rearward direction of the stanchions 76 (i.e., closer toward the second end 71b of the reinforcement bracket 26). Each of the first and second mounting structures 82a, 82b have a cylindrical shape defining an opening 84. A fastener (not shown) may extend through the opening 84 and through the inner shell 58, thereby securing the reinforcement bracket 26 to the A-pillar 22a. In some forms, the reinforcement bracket 26 may be secured to the A-pillar 22a by welding, adhesives, or any other suitable attachment means in addition to or instead of fasteners.

The support portions 80 extend inwardly (i.e., toward the trim panel 72) from the mounting portion 70 and connect the stanchions 76 to the mounting portion 78. In the example illustrated, a first support portion 80 of the plurality of support portions 80 is disposed nearer the first end 71a (FIG. 1) of the reinforcement bracket 26 than the stanchions 76 and extends from a first location of the mounting portion 78 while a second support portion 80 of the plurality of support portions 80 is nearer the second end 71b (FIG. 1) of the reinforcement bracket 26 than the stanchions 76 and extends from a second location of the mounting portion 78 that is lower than the first location. In some forms, the first support portion 80 may extend from a first location of the mounting portion 78 and the second support portion 80 may extend from a second location of the mounting portion 78 that is above the first location.

The mounting portion 78 and the support portions 80 include openings 86 of various shapes formed therein. The openings 86 may be arranged such that struts or trusses (not specifically labelled) are formed between adjacent openings 86. In this way, the weight of the reinforcement bracket 26 is reduced while maintaining its structural strength. A thickness of the mounting portion 78 may be equal to or greater than a thickness of the support portions 80. A material of the mounting portion 78 may be the same as or different than a material of the support portions 80.

Each reinforcement bracket 26 includes one or more mounting features 88 (e.g., hooks or clips) configured to secure at least one vehicle component 89 (FIG. 4; e.g., a wire bundle, a fluid line, and an air curtain) to the reinforcement bracket 26. In the example illustrated, the mounting features 88 are attached to the mounting portion 78 or are integrally formed therewith. In some forms, the mounting features 88 may be attached to or integrally formed with the support portions 80 in addition to, or instead of, the mounting portion 78. The mounting features 88 may utilize a snap fit, a press-fit or any other suitable assembly methods to secure the vehicle component 89 to the reinforcement bracket 26. In the example illustrated, the mounting features 88 are additively manufactured as an integral part of the reinforcement body 74. In some forms, the mounting features 88 may be separate components that are secured to the reinforcement body 74 using any suitable attachment method. In some forms, fasteners (not shown) may also be additively manufactured along with the reinforcement bracket 26 and configured to secure the reinforcement bracket 26 to the A-pillar 22a, for example.

The stanchions 76 are located at an inboard side of the A-pillar 22a and are spaced apart from the A-pillar 22a. The stanchions 76 are configured for mounting a vehicle component 90 (FIG. 1). In the example illustrated, the vehicle component 90 is a visor assembly that is rotatably coupled to one stanchion 76 and that includes a visor that extends into the occupant cabin to help shade the eyes of the passengers from the glare of the sunlight, for example. In one form, the visor assembly is rotatably coupled to the stanchion by a pin (not shown) that extends through a coupling structure of the visor assembly and connect to the stanchion 76, thereby rotatably connecting the visor assembly to the reinforcement bracket 26. In the example illustrated, the stanchions 76 have a cylindrical shape defining an opening 92, through which the pin (not shown) of the visor assembly can extend. The support portions 80 are connected to an outer cylindrical surface of the stanchion 76 to support the stanchion 76 spaced apart from and inboard of the mounting portion 78.

The reinforcement brackets 26 of the present disclosure being additively manufactured provides the benefit of allowing attachment structures to be added to the reinforcement brackets 26. In this way, vehicle components such as visor assemblies may be coupled to the reinforcement brackets 26 particularly in vehicles where there is no front header while also providing reinforcement of the vehicle pillars such as the A-pillars 22a. It should be understood that the reinforcement brackets 26 may be additively manufactured to include other structures.

With reference to FIG. 6, another reinforcement bracket 126 is provided. The reinforcement bracket 126 may be incorporated into the vehicle 10 instead of, or in addition to, reinforcement bracket 26 disclosed above. The structure and function of reinforcement bracket 126 is similar or identical to that of reinforcement bracket 26 apart from any exception noted below.

The reinforcement bracket 126 includes a reinforcement body 174 and a stanchion 176. The reinforcement body 174 extends along a longitudinal direction of the vehicle A-pillar 22a (FIG. 1) and is secured to the inboard side 70 (FIG. 3) of the inner shell 58 (FIG. 3). The reinforcement body 174 includes a plurality of mounting portions 178a, 178b and a plurality of support portions or walls 180a, 180b. The mounting portion 178a has a shape that corresponds to the inboard side of the inner shell 58 and contacts the inboard side 70 (FIG. 3) of the inner shell 58 (FIG. 3). The mounting portion 178a includes a plurality of mounting structures 182a. The plurality of mounting structures 182a are located in a forward direction of the stanchions 176. Each of the mounting structures 182a has an opening 184a. A fastener (not shown) may extend through the opening 184a and through the inner shell 58 (FIG. 3), thereby securing the reinforcement bracket 126 to the A-pillar 22a (FIG. 1).

The mounting portion 178b has a shape that corresponds to the inboard side of the inner shell 58 (FIG. 3) and contacts the inboard side 70 (FIG. 3) of the inner shell 58 (FIG. 3). The mounting portion 178b has a width that is greater than a width of the mounting portion 178a and a length that is greater than a length of the mounting portion 178a. In some forms, the mounting portion 178a may have a length that is greater than a length of the mounting portion 178b. The mounting portion 178b defines a plurality of openings 181 and includes a plurality of mounting structures 182b. The plurality of openings 181 extend through the mounting portion 178b such that struts or trusses (not specifically labelled) are formed between adjacent openings 181. In this way, the weight of the reinforcement bracket 126 is reduced while maintaining its structural strength. The plurality of openings 181 are also located between two mounting structures 182b of the plurality of mounting structures 182b and may have various shapes (e.g., triangular, trapezoidal, square, circular, irregular). The plurality of mounting structures 182b are located in a rearward direction of the stanchions 176. Each of the mounting structures 182b has an opening 184b. A fastener (not shown) may extend through the opening 184b and through the inner shell 58 (FIG. 3), thereby further securing the reinforcement bracket 126 to the A-pillar 22a (FIG. 1).

The plurality of support portions 180a extend inboard and rearward in an arcuate manner from a rear end 185a of the mounting structure 178a (i.e., the rear end 185a of the mounting structure 178a is located proximate the stanchion 176 compared to the front end 185b) to the stanchion 176.

In the example provided, the plurality of support portions 180a includes two support portions 180a that are also vertically spaced apart from each other such that one is above the other. In the example illustrated, the two support portions 180a are more spaced apart from each other near or at a middle portion of the support portions 180a than near the stanchion 176 or the mounting structure 178a. The plurality of support portions 180b extend inboard and forward in an arcuate manner from a front end 186a of the mounting structure 178b (i.e., the front end 186a of the mounting structure 178b is located proximate the stanchion 176 compared to the rear end 186b) to the stanchion 176. In the example provided, the plurality of support portions 180b includes two support portions 180b that are also vertically spaced apart from each other such that one is above the other. In the example illustrated, the two support portions 180b are more spaced apart from each other near or at a middle portion of the support portions 180b than near the stanchion 176 or the mounting structure 178b. The two support portions 180a, the two support portions 180b, and the stanchion 176 cooperate with each other to define a semi-circular shape or arch that spaces the stanchion 176 apart from and inboard of the mounting portions 178a, 178b.

The stanchion 176 is located at an inboard side of the A-pillar 22a (FIG. 1) and is spaced apart from the A-pillar 22a (FIG. 1). The stanchion 176 is configured for mounting a vehicle component similar to the stanchion 76 (FIG. 5). In the example illustrated, the stanchion 176 has a cylindrical shape defining an opening 192.

With reference to FIG. 7, another reinforcement bracket 226 is provided. The reinforcement bracket 226 may be incorporated into the vehicle 10 instead of, or in addition to, reinforcement bracket 26 disclosed above. The structure and function of reinforcement bracket 226 is similar or identical to that of reinforcement bracket 26 apart from any exception noted below.

The reinforcement bracket 226 includes a reinforcement body 274 and a stanchion 276. The reinforcement body 274 and the stanchion 276 may be similar or identical to the reinforcement body 74 and the stanchion 76, respectively, described above, and therefore, will not be described again in detail. The reinforcement bracket 226 may also include a grab-handle structure 280 for attachment to a vehicle grab handle 282 (e.g., overhead handle that an occupant uses to facilitate egress from the vehicle 10). In the example illustrated, the grab-handle structure 280 extends from an upper portion of the reinforcement body 274 and includes a plurality of supports 284 that extend inwardly toward the trim panel 72 (FIG. 3). Mounts of the grab handle 282 may extend through the trim panel 72 (FIG. 3) and be secured to the supports 284 (e.g., via fasteners; not shown) to facilitate the grab handle 282 attachment to the reinforcement bracket 226.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle body structure comprising:
   a vehicle pillar; and
   a unitized reinforcement bracket mounted to the vehicle pillar and comprising a reinforcement body and one or more stanchions, the reinforcement body extending along a longitudinal direction of the vehicle pillar, the one or more stanchions located at an inboard side of the vehicle pillar and configured for mounting a vehicle component,
   wherein the reinforcement body comprises a mounting portion that contacts the vehicle pillar, and wherein the mounting portion includes a plurality of first mounting structures located in a forward direction of the one or more stanchions and a plurality of second mounting structures located in a rearward direction of the one or more stanchions.

2. The vehicle body structure of claim 1, wherein the vehicle pillar includes an outer member and an inner member secured to each other to define an internal cavity, and wherein the unitized reinforcement bracket is mounted to the inner member.

3. The vehicle body structure of claim 2, wherein the unitized reinforcement bracket is located external to the internal cavity.

4. The vehicle body structure of claim 2, wherein the vehicle pillar is an A-pillar.

5. The vehicle body structure of claim 2, wherein the unitized reinforcement bracket extends substantially an entire length of the vehicle pillar.

6. The vehicle body structure of claim 1, wherein the unitized reinforcement bracket includes mounting features configured to secure at least one of a wire bundle, a fluid line, and an air curtain to the unitized reinforcement bracket.

7. The vehicle body structure of claim 6, wherein the mounting features are snap-fit attachments.

8. The vehicle body structure of claim 1, further comprising a trim panel secured to the vehicle pillar, the reinforcement body being disposed between the trim panel and the vehicle pillar.

9. The vehicle body structure of claim 1, wherein the unitized reinforcement bracket is mounted to the vehicle pillar by mechanical fasteners.

10. The vehicle body structure of claim 1, wherein the one or more stanchions are disposed between two arcuate walls of the reinforcement body.

11. The vehicle body structure of claim 1, wherein the one or more stanchions are spaced apart from the vehicle pillar.

12. The vehicle body structure of claim 1, further comprising:
    a hinge pillar; and
    a B-pillar connected to the hinge pillar by the vehicle pillar,
    wherein the unitized reinforcement bracket is located closer towards the B-pillar than the hinge pillar.

13. A vehicle body structure comprising:
    a vehicle pillar comprising an outer member and an inner member secured to each other;
    a unitized reinforcement bracket comprising a reinforcement body and one or more stanchions, the reinforcement body comprises a pillar mounting portion mounted to the inner member of the vehicle pillar and a plurality of support portions extending from the pillar mounting portion, the one or more stanchions located at an inboard side of the inner member of the vehicle pillar and connected to the pillar mounting portion by one or more support portions of the plurality of support portions; and
    a visor assembly coupled to the one or more stanchions.

14. The vehicle body structure of claim 13, wherein the visor assembly is rotatably coupled to the one or more stanchions.

15. The vehicle body structure of claim 13, wherein the one or more stanchions are connected to the pillar mounting portion by two support portions of the plurality of support portions, and wherein one support portion of the two support portions extends from a first location of the pillar mounting portion and the other support portion of the two support portions extends from a second location of the pillar mounting portion that is lower than the first location.

16. The vehicle body structure of claim 13, wherein the unitized reinforcement bracket extends substantially an entire length of the vehicle pillar.

17. The vehicle body structure of claim 13, wherein the unitized reinforcement bracket includes mounting features configured to secure at least one of a wire bundle, a fluid line, and an air curtain to the unitized reinforcement bracket.

18. The vehicle body structure of claim 13, wherein the unitized reinforcement bracket includes a first end located toward a front of the vehicle pillar and a second end located toward a rear of the vehicle pillar, and wherein the unitized reinforcement bracket has an arcuate shape from the first end toward the second end.

19. A vehicle comprising:
    an A-pillar;
    a unitized reinforcement bracket located externally relative to the A-pillar and comprising a reinforcement body and one or more stanchions, the reinforcement body extending along a longitudinal direction of the A-pillar and comprising a pillar mounting portion mounted to the A-pillar and a plurality of support portions extending from the pillar mounting portion, the one or more stanchions located at an inboard side of the A-pillar and connected to the pillar mounting portion by one or more support portions of the plurality of support portions;
    a trim panel secured to the A-pillar and housing the unitized reinforcement bracket; and
    a visor assembly rotatably coupled to the one or more stanchions,
    wherein the unitized reinforcement bracket includes mounting features configured to secure at least one of a wire bundle, a fluid line, and an air curtain to the unitized reinforcement bracket.

20. A unitized reinforcement bracket comprising:
    a reinforcement body including a mounting portion and a supporting portion, the mounting portion extending along a longitudinal direction and configured to be mounted to a vehicle pillar, the mounting portion includes one or more first mounting structures and one or more second mounting structures; and
    one or more stanchions configured for mounting a vehicle component,
    wherein the one or more first mounting structures are located in a forward direction of the one or more stanchions and the one or more second mounting structures are located in a rearward direction of the one or more stanchions, wherein the supporting portion extends in the longitudinal direction along the mounting portion from or near a first end of the mounting portion toward a second opposing end of the mounting portion, the supporting portion supporting the one or more stanchions.

21. The unitized reinforcement bracket of claim of claim 20, further comprising mounting features configured to secure at least one of a wire bundle, a fluid line, and an air curtain to the unitized reinforcement bracket.

22. The unitized reinforcement bracket of claim 20, wherein reinforcement body includes two arcuate walls, and wherein the one or more stanchions are disposed between the two arcuate walls of the reinforcement body.

23. The unitized reinforcement bracket of claim 20, wherein the support portion includes a plurality of support portions supporting the one or more stanchions, and wherein one support portion of the plurality of support portions extends from a first location of the mounting portion and another support portion of the plurality of support portions extends from a second location of the mounting portion that is lower than the first location.

\* \* \* \* \*